United States Patent
Xavier

(10) Patent No.: US 9,405,902 B1
(45) Date of Patent: Aug. 2, 2016

(54) ANTI-MALWARE SERVICE IN MULTI-TENANT CLOUD COMPUTING ENVIRONMENTS

(75) Inventor: Jijo M. Xavier, Milpitas, CA (US)

(73) Assignee: Trend Micro Incorporated, Tokyo (JP)

( * ) Notice: Subject to any disclaimer, the term of this patent is extended or adjusted under 35 U.S.C. 154(b) by 1060 days.

(21) Appl. No.: 13/048,741

(22) Filed: Mar. 15, 2011

(51) Int. Cl.
G06F 21/00 (2013.01)
G06F 21/56 (2013.01)
G06F 9/455 (2006.01)

(52) U.S. Cl.
CPC ............ *G06F 21/56* (2013.01); *G06F 9/45558* (2013.01)

(58) Field of Classification Search
CPC .................... G06F 9/45558; G06F 2009/4557; G06F 21/56; G06F 21/568
USPC .......................................................... 726/24
See application file for complete search history.

(56) References Cited

U.S. PATENT DOCUMENTS

| | | | |
|---|---|---|---|
| 5,623,600 A | 4/1997 | Ji et al. | |
| 6,092,194 A | 7/2000 | Touboul | |
| 6,195,587 B1 | 2/2001 | Hruska et al. | |
| 6,938,097 B1 | 8/2005 | Vincent et al. | |
| 7,010,807 B1 | 3/2006 | Yanovsky | |
| 2002/0119427 A1* | 8/2002 | Brown et al. | 434/1 |
| 2002/0174358 A1* | 11/2002 | Wolff et al. | 713/200 |
| 2004/0158741 A1* | 8/2004 | Schneider | 713/201 |
| 2006/0218544 A1* | 9/2006 | Chakraborty et al. | 717/168 |
| 2007/0174910 A1* | 7/2007 | Zachman et al. | 726/18 |
| 2008/0134177 A1* | 6/2008 | Fitzgerald et al. | 718/1 |
| 2008/0289028 A1* | 11/2008 | Jansen et al. | 726/11 |
| 2009/0187929 A1* | 7/2009 | Kushwaha et al. | 719/330 |
| 2009/0210427 A1* | 8/2009 | Eidler et al. | 707/10 |
| 2009/0288084 A1* | 11/2009 | Astete et al. | 718/1 |
| 2009/0293056 A1* | 11/2009 | Ferris | 718/1 |
| 2010/0192207 A1* | 7/2010 | Raleigh | 726/6 |
| 2010/0275241 A1* | 10/2010 | Srinivasan | 726/1 |
| 2010/0306377 A1* | 12/2010 | DeHaan et al. | 709/226 |
| 2010/0306765 A1* | 12/2010 | DeHaan | 718/1 |
| 2010/0306767 A1* | 12/2010 | DeHaan | 718/1 |

(Continued)

OTHER PUBLICATIONS

Jansen, W.A.; , "Cloud Hooks: Security and Privacy Issues in Cloud Computing," System Sciences (HICSS), 2011 44th Hawaii International Conference on , vol., No., pp. 1-10, Jan. 4-7, 2011.*

(Continued)

*Primary Examiner* — Syed Zaidi
(74) *Attorney, Agent, or Firm* — Okamoto & Benedicto LLP

(57) ABSTRACT

A host machine hosts virtual machines on a first logical layer, and a multi-tenant cloud computing environment on a second logical layer running on top of the first logical layer. An anti-malware provides an anti-malware service to virtual machines on the first logical layer. A tenant of the multi-tenant cloud computing environment may lease a virtual machine, and select the virtual machine for subscription to the anti-malware service. A second identifier of the selected virtual machine on the second logical layer is used to determine a first identifier of the selected virtual machine on the first logical layer. The selected virtual machine is identified to the anti-malware using the first identifier. The anti-malware provides anti-malware service to the selected virtual machine. An anti-malware broker may be employed to facilitate selection of the selected virtual machine, and to allow the anti-malware to identify virtual machines subscribed to the anti-malware service.

11 Claims, 4 Drawing Sheets

(56) References Cited

U.S. PATENT DOCUMENTS

2010/0332593 A1* 12/2010 Barash et al. ............. 709/203
2011/0055396 A1* 3/2011 DeHaan .................... 709/226

OTHER PUBLICATIONS

Pearson, S.; Benameur, A.; , "Privacy, Security and Trust Issues Arising from Cloud Computing," Cloud Computing Technology and Science (CloudCom), 2010 IEEE Second International Conference on , vol., No., pp. 693-702, Nov. 30, 2010-Dec. 3, 2010.*

Nair, S.K.; Porwal, S.; Dimitrakos, T.; Ferrer, A.J.; Tordsson, J.; Sharif, T.; Sheridan, C.; Rajarajan, M.; Khan, A.U.; , "Towards Secure Cloud Bursting, Brokerage and Aggregation," Web Services (ECOWS), 2010 IEEE 8th European Conference on , vol., No., pp. 189-196, Dec. 1-3, 2010.*

Deep Security—Enterprise Virtualization Security, 2 pages [retrieved on Mar. 2, 2011], retrieved from the internet: http://us.trendmicro.com/us/products/enterprise/datacenter-security/deep-security/index.html.

Dave Asprey "Who Owns Security in the Cloud?", a Trend Micro Opinion Piece, Feb. 2011, 8 pages.

Eva Chen "A Brave New (Security)World", How Security is Changing to Support Virtualization and Cloud Computing, a Trend Micro White Paper, Jan. 2011, 13 pages.

* cited by examiner

ANTI-MALWARE SERVICE IN MULTI-TENANT CLOUD COMPUTING ENVIRONMENTS

BACKGROUND OF THE INVENTION

1. Field of the Invention

The present invention relates generally to computer security, and more particularly but not exclusively to methods and apparatus for securing cloud computing environments.

2. Description of the Background Art

Virtual machines, in general, are well known in the art of computer science. Generally speaking, a virtual machine is a software implementation of a machine (i.e., a computer) that executes programs like a physical machine. Multiple virtual machines may run on a single computer hardware platform, which is also referred to as "host machine." Although the virtual machines run in the same host machine, each virtual machine has its own operating system and application programs, and functions as a computing environment separate from the other virtual machines. Just like a physical machine, a virtual machine may be infected with malware, such as computer viruses, worms, Trojans, rootkits, and spyware.

Cloud computing refers to services, storage, processing, and other computing tasks performed over a computer network using distant server computers. Cloud computing provides computational resources to an end-user, also referred to as a "tenant," without the end-user setting up his own computing infrastructure. Embodiments of the present invention pertain to providing anti-malware services to virtual machines in multi-tenant cloud computing environments.

SUMMARY

In one embodiment, a method of providing an anti-malware service to a multi-tenant cloud computing environment includes determining image names of virtual machines leased by a tenant in a cloud computing environment having a plurality of tenants, the cloud computing environment including a cloud layer running on top of a virtualization layer, the image names identifying the virtual machines on the cloud layer. A selection of virtual machines to be subscribed to the anti-malware service is received, the selection identifying selected virtual machines leased by the tenant. The image names of the selected virtual machines are used to determine corresponding virtual machine names of the selected virtual machines, the virtual machine names identifying the selected virtual machines on the virtualization layer. An anti-malware is informed of the selected virtual machines identified by their respective virtual machine names, the anti-malware running on the virtualization layer. The anti-malware is used to provide the anti-malware service to the selected virtual machines on the virtualization layer, the anti-malware service including scanning files of the selected virtual machines for malware.

In another embodiment, a system of providing anti-malware service to a multi-tenant cloud computing environment comprises a host machine hosting a plurality of virtual machines on a first logical layer, and a multi-tenant cloud computing environment on a second logical layer running on top of the first logical layer, the host machine being configured to allow a tenant of the multi-tenant cloud computing environment to select a selected virtual machine to receive anti-malware service, to determine a second identifier of the selected virtual machine on the second logical layer, to determine a first identifier of the selected virtual machine on the first logical layer using the second identifier, and to enable anti-malware service for the selected virtual machine on the first logical layer.

In another embodiment, a method of providing an anti-malware service to a multi-tenant cloud computing environment includes selecting a selected virtual machine in a plurality of virtual machines in a multi-tenant cloud computing environment, the cloud computing environment being on a second logical layer running on top of first logical layer, the first logical layer being a virtualization layer. An instance of the selected virtual machine on the virtualization layer is identified. An anti-malware service is provided to the instance of the selected virtual machine.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
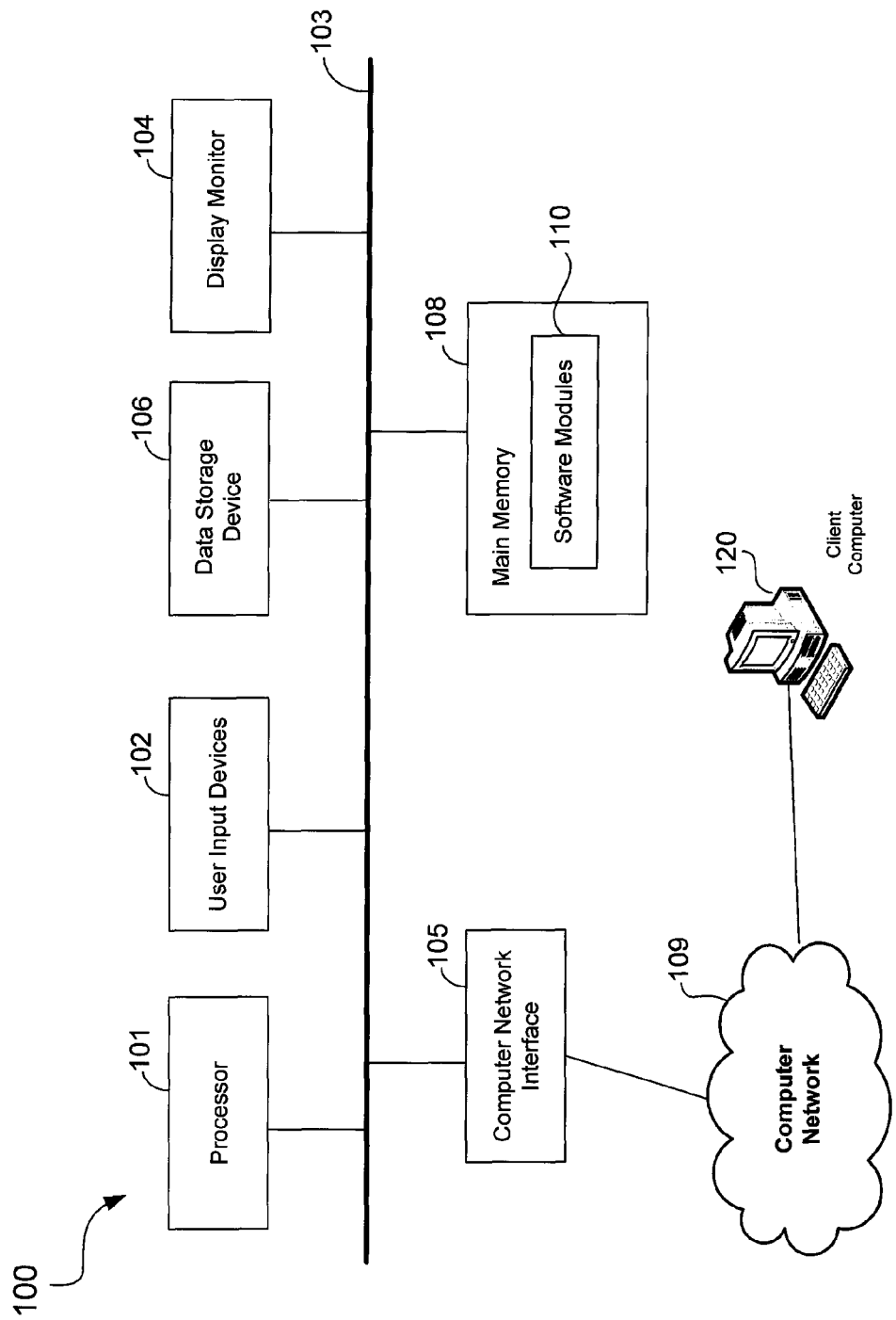
FIG. 1 shows a schematic diagram of a computer system in accordance with an embodiment of the present invention.

FIG. 1 shows a schematic diagram of a computer system 100 in accordance with an embodiment of the present invention. The computer system 100 may be a server computer configured as a host machine, for example. The computer system 100 may have fewer or more components to meet the needs of a particular application. The computer system 100 may include one or more processors 101. The computer system 100 may have one or more buses 103 coupling its various components. The computer system 100 may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM). The computer network interface 105 may be coupled to a computer network 109, which in this example includes the Internet.

The computer system 100 is a particular machine as programmed with software modules 110. The software modules 110 comprise computer-readable program code stored non-transitory in the main memory 108 for execution by a processor 101. The software modules 110 may be loaded from the data storage device 106 to the main memory 108. The software modules 110 may also be made available in other computer-readable medium including optical disk, flash drive, and other memory device.

In one embodiment, the computer system 100 is configured as a host machine for a plurality of virtual machines. The computer system 100 may be configured to have a first logical layer and a second logical layer. The first logical layer may comprise a virtualization layer comprising a plurality of virtual machines. The second logical layer, which runs on top of the first logical layer, may comprise a cloud layer. An end-user, referred to herein as a "tenant" or "customer", may use a client computer 120 to access and use a virtual machine by way of the cloud layer.

Figure 2:
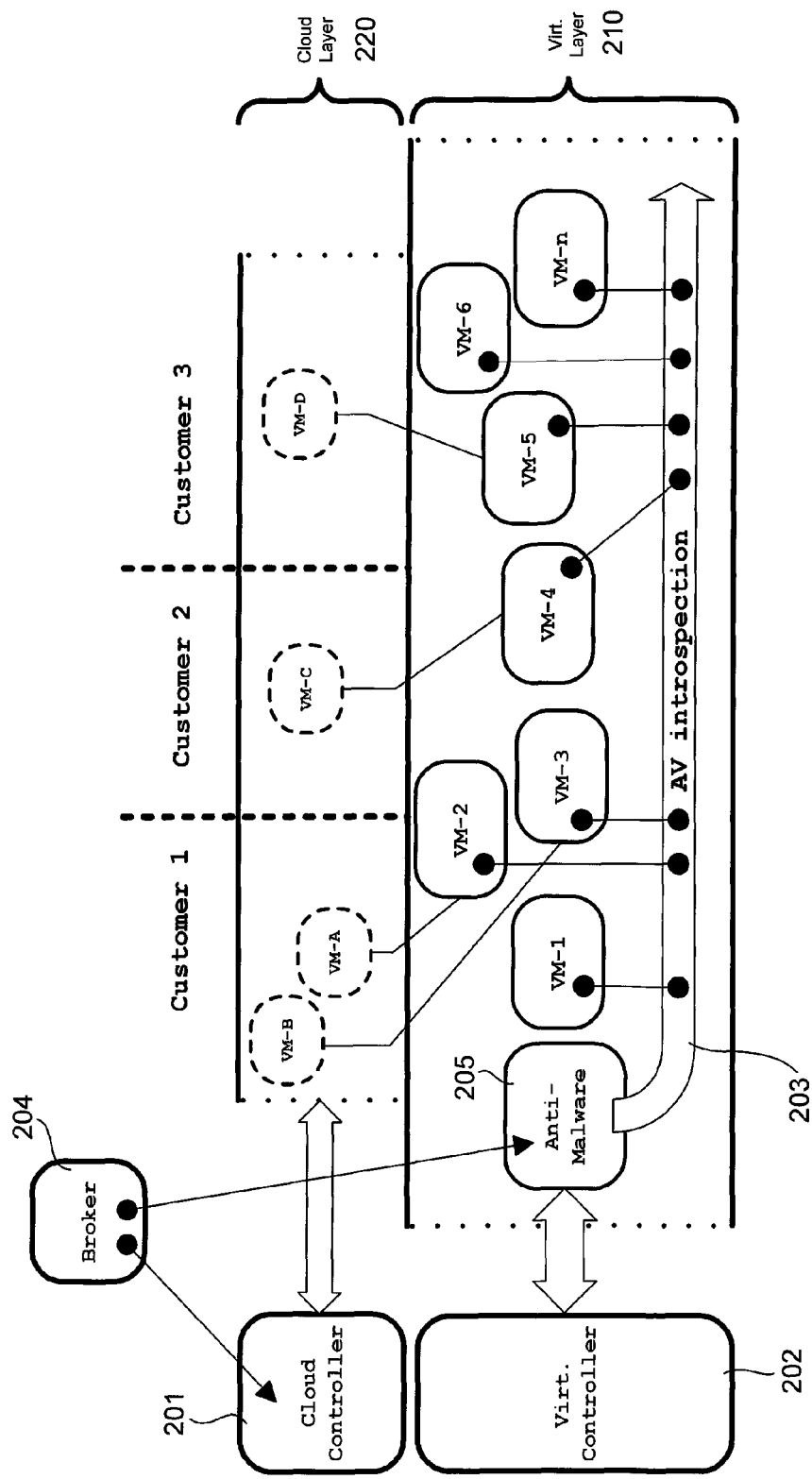
FIG. 2 schematically shows a multi-tenant cloud computing environment in accordance with an embodiment of the present invention.

FIG. 2 schematically shows a multi-tenant cloud computing environment in accordance with an embodiment of the present invention. The cloud computing environment may comprise software modules running on the computer system 100. The cloud computing environment may be implemented using the VMware vSphere™ virtualization platform, for example. Other suitable virtualization platforms may also be used.

In the example of FIG. 2, the computer system 100 is configured to have two logical layers, namely a virtualization layer 210 and a cloud layer 220 running on top of the virtualization layer 210. The virtualization layer 210 comprises instances of virtual machines, labeled as "VM-1," "VM-2," "VM-3," . . . , "VM-n." Each virtual machine may include its own operating system and application programs, separate from those of the host machine and other virtual machines. The virtualization layer 210 provides resource isolation. That is, the virtualization layer 210 isolates the virtual machines from each other. In some embodiments, the virtualization layer 210 may be hosted on a plurality of computer systems 100.

The virtualization controller 202 may comprise computer-readable program code for controlling the operations of virtual machines on the virtualization layer 210. In one embodiment, the virtualization controller 202 is configured to control the life cycle of virtual machines, provide connectivity, and provide an environment for an anti-malware 205 to perform introspection.

The anti-malware 205 may comprise computer-readable program code for protecting a virtual machine from malware, such as computer viruses, worms, Trojans, rootkits, and spyware. The anti-malware 205 may consult a database or other listing to determine if a tenant is authorized to request anti-malware service for one or more virtual machines. An anti-malware administrator may log into the anti-malware 205 to provide authorization to particular tenants, which may be identified by their credentials, such as login identifier, tenant name, password, and so on. The anti-malware 205 may comprise the Deep Security™ security product from Trend Micro, Inc., for example. Other anti-malware may also be used without detracting from the merits of the present invention.

In the example of FIG. 2, the anti-malware 205 runs on the virtualization layer 210. The anti-malware 205 may monitor (arrow 203) and control data operations in the virtual machines by way of the hypervisor, for example. As a particular example, the anti-malware 205 may detect a file access in a virtual machine, examine the file access for characteristics of malware activity, and prohibit the file access if the access is deemed by the anti-malware 205 as being performed by malware. As another example, the anti-malware 205 may periodically scan the files of the virtual machines for computer viruses. The anti-malware 205 may perform one or more predetermined actions in response to detection of malware, including suspending file access, putting an infected file under quarantine, and alerting an administrator to name some examples.

In the example of FIG. 2, a second logical layer in the form of the cloud layer 220 runs on top of the virtualization layer 210. In one embodiment, the cloud layer 220 is multi-tenant. That is, the cloud layer 220 may provide a cloud computing environment for several, different tenants. A tenant may comprise an entity, such as a person, business, or organization, leasing a virtual machine. Each tenant may be a customer of a cloud service provider operating and maintaining the computer system 100. Examples of cloud service providers include Amazon Web Services™ Rackspace™ GoGrid™, and Eucalyptus™ cloud service providers. The cloud layer 220 isolates one tenant from another so that each tenant will only see and access virtual machines belonging to him.

Each tenant may lease one or more virtual machines. In the example of FIG. 2, a first tenant (Customer 1) leased virtual machines VM-A and VM-B, a second tenant (Customer 2) leased a virtual machine VM-C, and a third tenant (Customer 3) leased a virtual machine VM-D. A tenant may specify the configuration of a virtual machine, including operating system, data storage space, and application programs. Although a virtual machine appears to a tenant as being on the cloud layer 220 for accessibility, the virtual machine is actually an instance of a virtual machine on the virtualization layer 210. In the example of FIG. 2, the virtual machines VM-2 and VM-3 are instances of virtual machines VM-A and VM-B leased by the Customer 1. Similarly, the virtual machines VM-4 and VM-5 are instances of the virtual machine VM-C of the Customer 2 and the virtual machine VM-D of the Customer 3, respectively. The virtual machines leased by the tenants may be employed to host an email server (e.g., Microsoft Exchange™ server), web server, a database server, or collaboration server (e.g., Microsoft Sharepoint™ server), for example.

The cloud controller 201 may comprise computer-readable program code for controlling operations of the cloud layer 220. The cloud controller 201 may be configured to keep track of image names and corresponding virtual machine names of virtual machines leased by particular tenants. An anti-malware broker 204 may be configured to communicate with the cloud controller 201 to collect the virtual machine image list for a particular tenant and translate image names included in the virtual machine image list to corresponding virtual machine names Just like a physical machine, a virtual machine may be infected with malware. A tenant may install an anti-malware in a virtual machine to protect against malware. However, this requires the tenant to install and maintain the anti-malware on his own, including ensuring that the anti-malware always has up-to-date malware signatures.

The virtualization layer 210 is not aware of the cloud layer 220 running on top of it. This results in the anti-malware 205 not being able to tell which instance of virtual machine in the virtualization layer 210 belongs to which tenant. In other words, although the anti-malware 205 may provide anti-malware protection to the virtual machines, the anti-malware 205 by itself cannot tell if a virtual machine belongs to a particular tenant.

The anti-malware broker 204 may comprise computer-readable program code for allowing an anti-malware running in the virtualization layer 210 to provide anti-malware service to virtual machines of particular tenants. The anti-malware service is optional and may be selected by the tenant as part of his virtual machine configuration. In one embodiment, the anti-malware broker 204 is configured to provide a user interface for receiving commands from and displaying messages to the tenant, to communicate with the cloud controller 201 to receive information on images and names of virtual machines leased by the tenant, and to communicate with the anti-malware 205 to identify virtual machines subscribed to the anti-malware service and to receive information regarding the anti-malware service provided to virtual machines. The anti-malware broker 204 may be implemented as a virtual machine running on the virtualization layer 210 or the cloud layer 220. In some embodiments, the anti-malware broker 204 may be implemented on an independent computer system having connectivity to the cloud controller 201 and the anti-malware 205. The anti-malware broker 204 may communicate with the cloud controller 201 and the anti-malware 205 directly without using the hypervisor. As will be more apparent below, the anti-malware broker 204 provides a link to communicate virtual machine information from the cloud controller 201 to the anti-malware 205.

In one embodiment, the anti-malware broker 204 is implemented as a web server. As a particular example, communications with the anti-malware broker 204 may be in accordance with the hypertext transport protocol (HTTP). The anti-malware broker 204 may also be implemented as a native application. The anti-malware broker 204 may be implemented as multi-tenant, allowing multiple tenants to access the anti-malware broker 204 at the same time, with each tenant having a session separate from that of other tenants.

Figure 3:
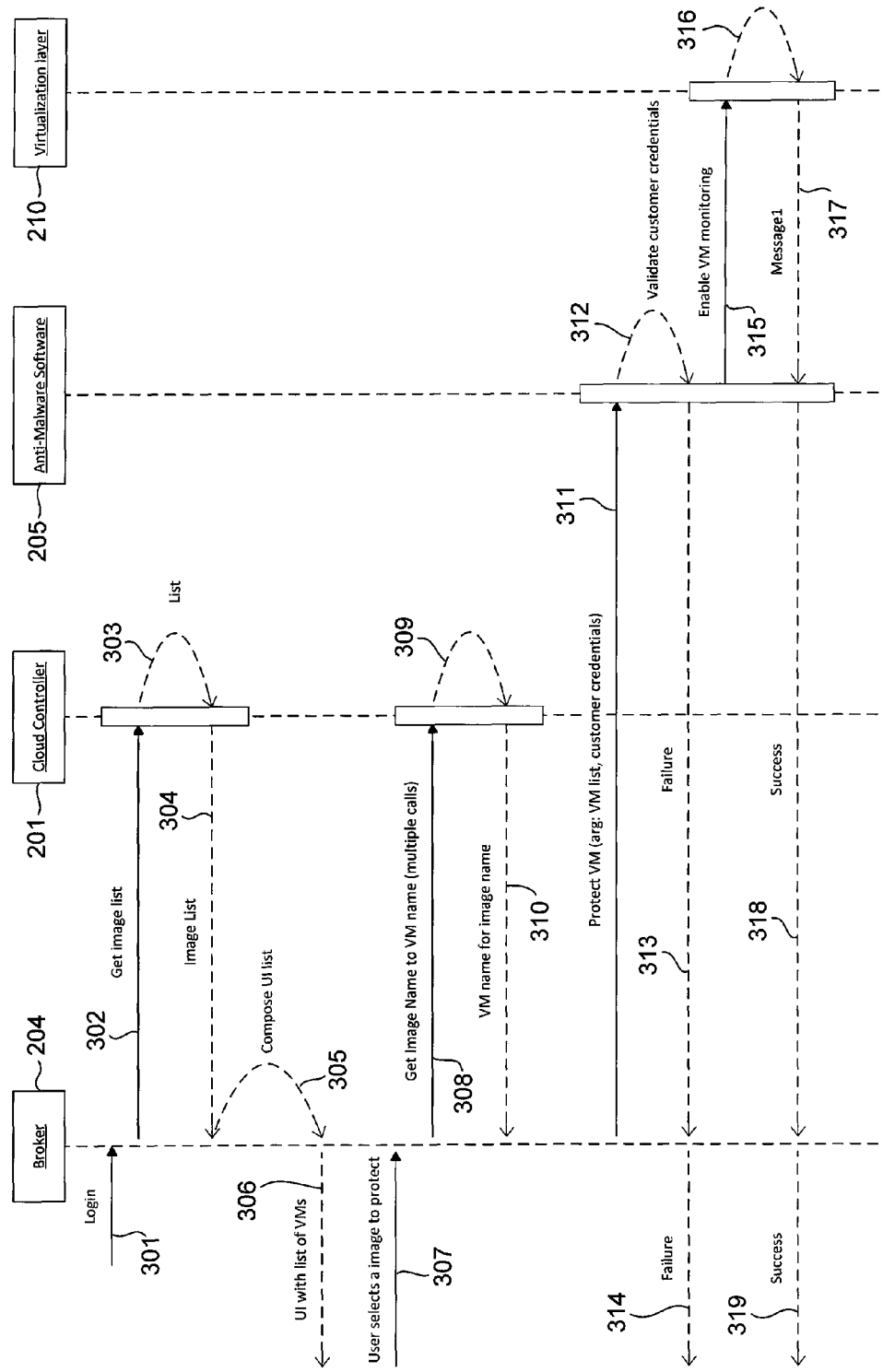
FIGS. 3 and 4 show a flow diagram illustrating a method of providing an anti-malware service in a multi-tenant cloud computing environment in accordance with an embodiment of the present invention.
Figure 4:
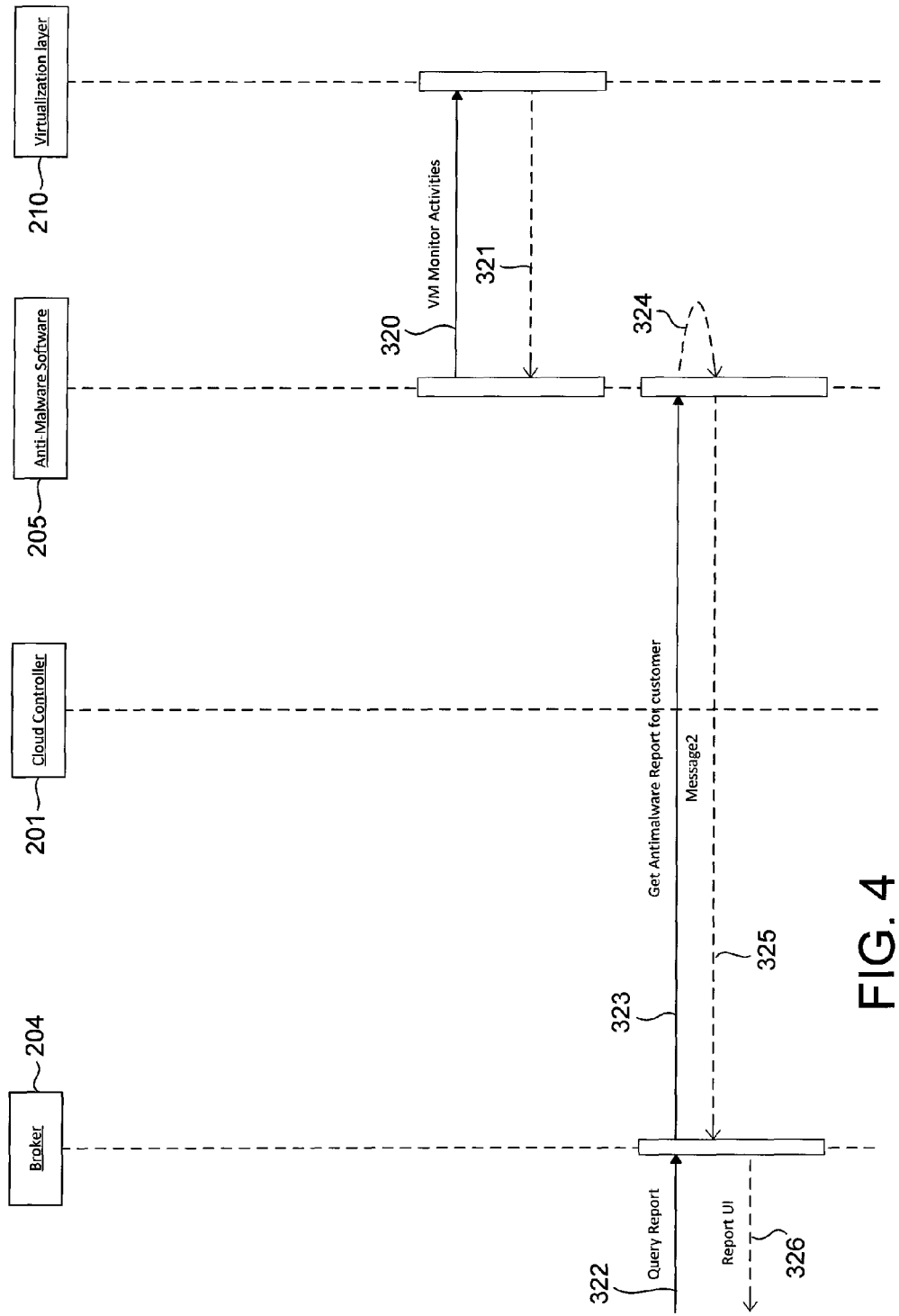

FIGS. 3 and 4 show a flow diagram illustrating a method of providing an anti-malware service in a multi-tenant cloud computing environment in accordance with an embodiment of the present invention. The method of FIGS. 3 and 4 is explained using the components of FIGS. 1 and 2 for illustration purposes only. Other components may also be used without detracting from the merits of the present invention.

Beginning with FIG. 3, a tenant may employ a client computer 120 (FIG. 1) to log into and communicate with the anti-malware broker 204 over a computer network (step 301). The anti-malware broker 204 receives the credentials of the tenant (e.g., login identifier, tenant name, password) and uses the credentials to request the tenant's virtual machine image list from the cloud controller 201 (step 302). The virtual machine image list indicates the virtual machines leased by the tenant in the multi-tenant cloud computing environment. Using the credentials, the cloud controller 201 may consult a database or other listing to identify the virtual machines leased by the tenant. The cloud controller 201 generates the virtual machine image list (step 303) and provides the list to the anti-malware broker 204 (step 304). The virtual machine image list may identify the virtual machines leased by the tenant by their image names. An image name constitutes a cloud layer identifier for a virtual machine.

The anti-malware broker 204 may compose the virtual machine image list into a form readily understandable by the tenant (step 305), and present the virtual machine image list to the tenant by way of a user interface (step 306). The tenant selects from the virtual machine image list one or more virtual machines that are to be subscribed to the anti-malware service (step 307). The anti-malware broker 204 receives the tenant's selection from the client computer 120. The anti-malware broker 204 requests the cloud controller 201 for the virtualization layer identifier of the virtual machines selected by the tenant (step 308).

The identifier of a virtual machine on the cloud layer 220 may be different from the identifier of an instance of the same virtual machine on the virtualization layer 210. To take this identifier difference into account, the anti-malware 204 requests the cloud controller 201 for a virtual machine name that corresponds to an image name selected by the tenant. As a particular example, the customer 3 (FIG. 2) may select the virtual machine VM-D, using its image name, to receive the anti-malware service. The anti-malware broker 204 receives the image name of the virtual machine VM-D from the client computer 120, and then requests the cloud controller 201 for the identifier of the corresponding virtual machine instance (i.e., VM-5) on the virtualization layer 210. In this particular example, the anti-malware broker 204 requests the cloud controller 201 for the virtual machine name of the virtual machine VM-D. This allows the anti-malware broker 204 to identify to the anti-malware 205 a particular virtual machine on the virtualization layer 210 that is subscribed to the anti-malware service.

The cloud controller 201 receives the image names of the virtual machines selected by the tenant, and consults a database or other listing for corresponding virtual machine names (step 309). The cloud controller 201 provides to the anti-malware broker 204 the virtual machine names of the virtual machines selected by the tenant (step 310).

The anti-malware broker 204 sends to the anti-malware 205 a protection request to provide anti-malware service to the virtual machines selected by the tenant (step 311). In one embodiment, the protection request includes the tenant's credentials and the virtual machine names of the virtual machines selected by the tenant. The anti-malware 205 validates the tenant's credentials (step 312). If the tenant's credentials indicate that the tenant is authorized to request anti-malware service for the selected virtual machines, the anti-malware 205 enables anti-malware service to the selected virtual machines (steps 315 and 316), and so informs the tenant by way of the anti-malware broker 204 (steps 318 and 319). Otherwise, if the tenant's credentials indicate that the tenant is not authorized to request anti-malware for the selected virtual machines, the anti-malware 205 so informs the tenant by way of the anti-malware broker 204 (steps 313 and 314). In that case, the anti-malware 205 does not provide anti-malware service to the selected virtual machines. This results in the anti-malware 205 being able to discriminate between virtual machines, providing anti-malware service only to those virtual machines subscribed to the anti-malware service.

The flow diagram continues in FIG. 4. As part of the anti-malware service, the anti-malware 205 monitors the activities of the selected virtual machines to protect the selected virtual machines from malware (steps 320 and 321). For example, the anti-malware 205 may scan files for presence of malware, prevent activities indicative of malware infection, and perform other anti-malware functions.

The tenant may request the anti-malware broker 204 for an anti-malware report for particular virtual machines subscribed to the anti-malware service (step 322). The anti-malware broker 204 may receive the request from the tenant's client computer 120. The report request may be for particular virtual machines identified by their image names. The anti-malware broker 204 determines the corresponding virtual machine names either by caching information previously received (see steps 308-310) or by querying the cloud controller 201. The anti-malware broker 204 includes the virtual machine names of the virtual machines in the report request, which the anti-malware broker 204 forwards to the anti-malware 205 (step 323). The anti-malware 205 prepares an anti-malware report for the virtual machines (step 324). The anti-malware report may include the number of malware detected, the number of malware removed, the number of files put in quarantine, and other anti-malware related information for a particular virtual machine. The anti-malware 205 provides the anti-malware report to the anti-malware broker 204 (step 325), which forwards the anti-malware report to the tenant by way of the user interface (step 326). The anti-malware broker 204 may format the anti-malware report into a form that is relatively easy to understand when displayed in the user interface employed by the tenant to communicate with the anti-malware broker 204.

Embodiments of the present invention provide advantages heretofore unrealized. Unlike other solutions that require tenants to install and maintain their own anti-malware, embodiments of the present invention provide an anti-malware service that may be centrally managed by a cloud service provider for all tenants. Furthermore, embodiments of the present invention enable use of an anti-malware running on the virtualization layer for particular tenants in a cloud computing environment. This advantageously allows the cloud service provider to provide the anti-malware service as an optional on-demand service to tenants in a multi-tenant cloud computing environment.

Methods and systems for providing anti-malware service to multi-tenant cloud computing environments have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of providing an anti-malware service to a multi-tenant cloud computing environment, the method comprising:
   determining image names of virtual machines leased by a tenant in a cloud computing environment having a plurality of tenants, the cloud computing environment including a cloud layer running on top of a virtualization layer, the image names identifying the virtual machines on the cloud layer;
   receiving a selection of virtual machines to be subscribed to the anti-malware service, the selection identifying selected virtual machines leased by the tenant;
   using image names of the selected virtual machines, determining corresponding virtual machine names of the selected virtual machines, the virtual machine names identifying the selected virtual machines on the virtualization layer;
   informing an anti-malware of the selected virtual machines identified by their respective virtual machine names, the anti-malware running on the virtualization layer; and
   using the anti-malware, providing the anti-malware service to the selected virtual machines on the virtualization layer, the anti-malware service including scanning files of the selected virtual machines for malware.

2. The method of claim 1 wherein the malware includes computer viruses, Trojans, and rootkits.

3. The method of claim 1 further comprising:
   receiving a report request from a client computer employed by the tenant, the report request being for a particular virtual machine in the selected virtual machines; and
   in response to receiving the report request, providing an anti-malware report to the client computer, the anti-malware report comprising anti-malware related information for the particular virtual machine.

4. The method of claim 1 further comprising:
   prior to providing the anti-malware service to the selected virtual machines on the virtualization layer, receiving credentials of the tenant; and
   validating the credentials to determine if the tenant is authorized to request anti-malware service for the selected virtual machines.

5. The method of claim 1 wherein at least one of the selected virtual machines hosts an email server.

6. The method of claim 1 further comprising:
   providing the tenant a user interface to select virtual machines.

7. The method of claim 6 wherein the tenant selects virtual machines over a computer network.

8. A system of providing anti-malware service to a multi-tenant cloud computing environment, the system comprising:
   a host machine hosting a plurality of virtual machines on a first logical layer, and a multi-tenant cloud computing environment on a second logical layer running on top of the first logical layer, the host machine being configured to allow a tenant of the multi-tenant cloud computing environment to select a virtual machine to receive anti-malware service, to determine a second identifier of the selected virtual machine on the second logical layer, to use the second identifier to determine a first identifier of the selected virtual machine on the first logical layer, and to enable anti-malware service for the selected virtual machine on the first logical layer.

9. The system of claim 8 further comprising:
   a client computer configured to allow the tenant to access the selected virtual machine over a computer network.

10. The system of claim 9 wherein the selected virtual machine hosts a web server.

11. The system of claim 8 wherein the anti-malware service includes scanning files in the selected virtual machine for computer viruses.

* * * * *